(12) United States Patent
Hong (10) Patent No.: US 11,601,032 B2
(45) Date of Patent: Mar. 7, 2023

(54) ELECTRICAL ANGLE CALCULATION DEVICE, ELECTRICAL ANGLE CALCULATION METHOD, AND PROGRAM

(71) Applicant: Sony Interactive Entertainment Inc., Tokyo (JP)

(72) Inventor: Sulgi Hong, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 382 days.

(21) Appl. No.: 16/921,245

(22) Filed: Jul. 6, 2020

(65) Prior Publication Data
US 2021/0028672 A1    Jan. 28, 2021

(30) Foreign Application Priority Data
Jul. 25, 2019  (JP) .............................. JP2019-136828

(51) Int. Cl.
*H02K 11/215* (2016.01)
*H02P 6/16* (2016.01)

(52) U.S. Cl.
CPC .............. *H02K 11/215* (2016.01); *H02P 6/16* (2013.01)

(58) Field of Classification Search
CPC ......... H02K 11/215; H02P 6/16; H02P 21/14; H02P 21/18
See application file for complete search history.

(56) References Cited

U.S. PATENT DOCUMENTS

| 5,942,863 A | 8/1999 | Wada |
| 10,224,842 B2 | 3/2019 | Tokairin |
| 11,453,438 B2* | 9/2022 | Suzuki ..................... G01B 7/30 |
| 2016/0056692 A1* | 2/2016 | Suzuki ................... H02K 29/08 |
| | | 310/68 B |
| 2018/0205330 A1 | 7/2018 | Tokairin |
| 2018/0234040 A1* | 8/2018 | Yokozawa ............ H02P 25/024 |

FOREIGN PATENT DOCUMENTS

| GB | 2483177 A  * | 2/2012 | ............ B60L 15/025 |
| JP | 7337076 A | 12/1995 | |
| JP | 9121584 A | 5/1997 | |
| JP | 2018-117414 A | 7/2018 | |
| JP | 2018201299 A | 12/2018 | |

OTHER PUBLICATIONS

Notice of Reasons for Refusal for corresponding JP Application No. 2019-136828, 8 pages, dated Apr. 22, 2021.

* cited by examiner

*Primary Examiner* — Mohamad A Musleh
(74) *Attorney, Agent, or Firm* — Matthew B. Dernier, Esq.

(57) ABSTRACT

Disclosed herein is an electrical angle calculation device including a signal value extraction section that extracts a signal value that monotonously increases or monotonously decreases with respect to an electrical angle of a motor from output signal values of a plurality of Hall sensors embedded in a stator of the motor, and an electrical angle calculation section that calculates the electrical angle from the extracted signal value.

8 Claims, 10 Drawing Sheets

ELECTRICAL ANGLE CALCULATION DEVICE, ELECTRICAL ANGLE CALCULATION METHOD, AND PROGRAM

CROSS REFERENCE TO RELATED APPLICATIONS

This application claims the benefit of Japanese Priority Patent Application JP 2019-136828 filed Jul. 25, 2019, the entire contents of which are incorporated herein by reference.

BACKGROUND

The present disclosure relates to an electrical angle calculation device, an electrical angle calculation method, and a program.

Vector control for a brushless direct-current motor (BLDC) may need information regarding a rotor position with respect to coils (electrical angle). In general, as in a technology described in, for example, Japanese Patent Laid-open No. 2018-117414, an external rotary encoder is used to acquire the electrical angle with the rotor stopped.

SUMMARY

However, the method that uses the external rotary encoder like the technology described in Japanese Patent Laid-open No. 2018-117414 is not necessarily advantageous in terms of a reduction in size and cost of a device.

Therefore, it is desirable to provide an electrical angle calculation device, an electrical angle calculation method, and a program, which enable calculation of an electrical angle using outputs of Hall sensors embedded in a motor.

According to an embodiment of the present disclosure, there is provided an electrical angle calculation device including a signal value extraction section that extracts a signal value that monotonously increases or monotonously decreases with respect to an electrical angle of a motor from output signal values of a plurality of Hall sensors embedded in a stator of the motor, and an electrical angle calculation section that calculates the electrical angle from the extracted signal value.

Preferably, the signal value extraction section extracts a signal value that is not either a maximum or a minimum among three or more signal values included in the output signal values for each phase section.

Preferably, the electrical angle calculation device further includes a phase index identification section that identifies a phase index indicating an amplitude relation between the three or more signal values for each phase section, and the signal value extraction section refers to the phase index and extracts the signal value.

Preferably, the electrical angle calculation device further includes a signal normalization section that normalizes the output signal values.

Preferably, the electrical angle calculation device further includes a maximum/minimum acquisition section that acquires a maximum and a minimum of each of the output signal values, and the signal normalization section normalizes the output signal values using amplitude that is a difference between the maximum and the minimum, and an offset amount that is equal to the minimum.

Preferably, the electrical angle calculation device further includes an auxiliary phase index decision section that decides an auxiliary phase index indicating an amplitude relation between three or more signal values included in the output signal values before normalization for each phase section, and the maximum/minimum acquisition section searches for the maximum of the signal value that is indicated to be maximum among the three or more signal values by the auxiliary phase index, and the minimum of the signal value that is indicated to be minimum among the three or more signal values by the auxiliary phase index.

According to another embodiment of the present disclosure, there is provided an electrical angle calculation method including extracting a signal value that monotonously increases or monotonously decreases with respect to an electrical angle of a motor from output signal values of a plurality of Hall sensors embedded in a stator of the motor, and calculating the electrical angle from the extracted signal value.

According to a further embodiment of the present disclosure, there is provided a program for a computer, including: by a signal value extraction section, extracting a signal value that monotonously increases or monotonously decreases with respect to an electrical angle of a motor from output signal values of a plurality of Hall sensors embedded in a stator of the motor; and by an electrical angle calculation section, calculating the electrical angle from the extracted signal value.

According to the above-described configuration, an electrical angle can be calculated using outputs of Hall sensors embedded in a motor.

DETAILED DESCRIPTION OF THE PREFERRED EMBODIMENTS

Hereinafter, with reference to the accompanying drawings, exemplary embodiments of the present disclosure will be described in detail. In the present description and the accompanying drawings, components having a substantially identical functional configuration are attached with an identical reference symbol, and description thereof is omitted.

Figure 1:
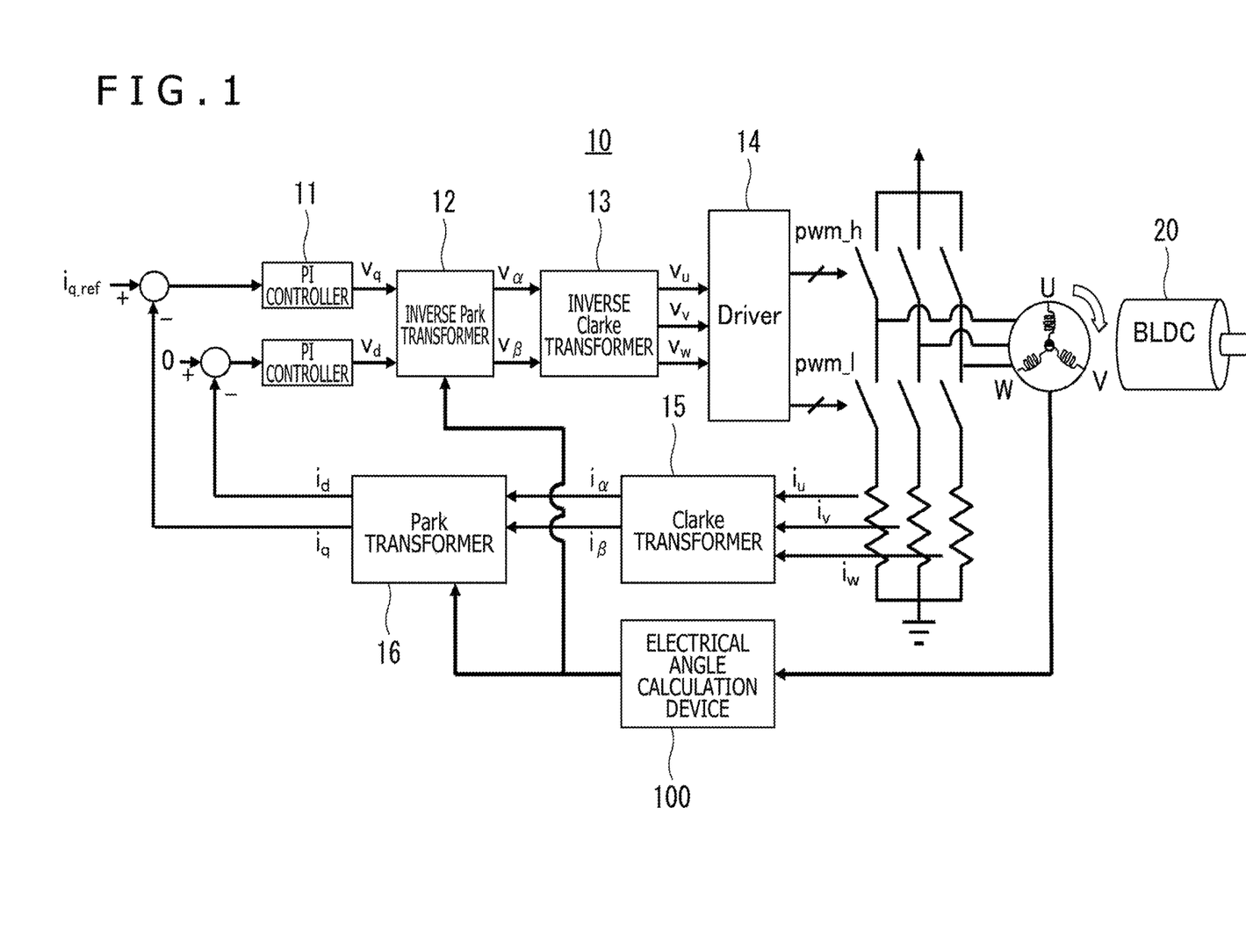
FIG. 1 is a block diagram illustrating a schematic configuration of a control device that calculates an electrical angle according to an exemplary embodiment of the present disclosure.

FIG. 1 is a block diagram illustrating a schematic configuration of a control device that calculates an electrical angle according to an exemplary embodiment of the present disclosure. A control device 10 includes a proportional-integral (PI) controller 11, an inverse Park transformer 12, an inverse Clarke transformer 13, a driver 14, a Clarke transformer 15, and a Park transformer 16, and controls a three-phase blushless direct-current motor (BLDC) 20. The control device 10 further includes an electrical angle calculation device 100. The electrical angle calculation device 100 calculates an electrical angle from outputs of analogue Hall sensors embedded in a stator of the BLDC 20. The calculated electrical angle is used in the inverse Park transformer 12 and the Park transformer 16.

Figure 2:
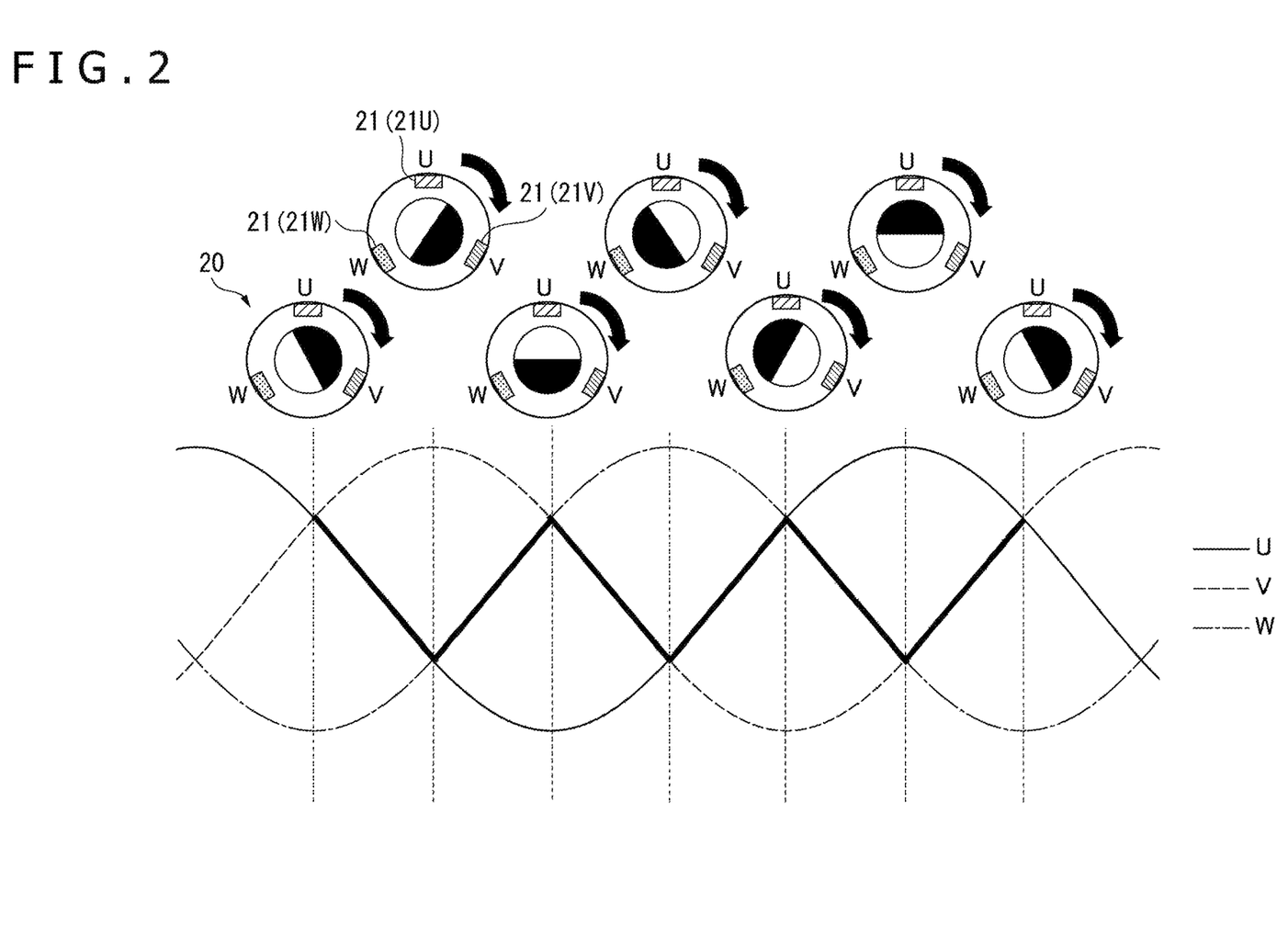
FIG. 2 is a diagram schematically illustrating outputs of analogue Hall sensors in an example illustrated in FIG. 1.

FIG. 2 is a diagram schematically illustrating the outputs of the analogue Hall sensors in the example illustrated in FIG. 1. In the illustrated example, analogue Hall sensors 21 (21U, 21V, and 21W) are respectively disposed at positions corresponding to coils for a U phase, a V phase, and a W phase in the BLDC 20. As illustrated in FIG. 2, signal values U, V, and W respectively output from the analogue Hall sensors 21U, 21V, and 21W vary according to magnetic strength of rotor poles in a sinusoidal shape. The present exemplary embodiment focuses on a fact that each of three signal values substantially linearly varies with respect to the phase at portions where each of three signal values does not take a maximum and a minimum. Therefore, the electrical angle is calculated by interpolating six linear portions for one rotation.

Figure 3:
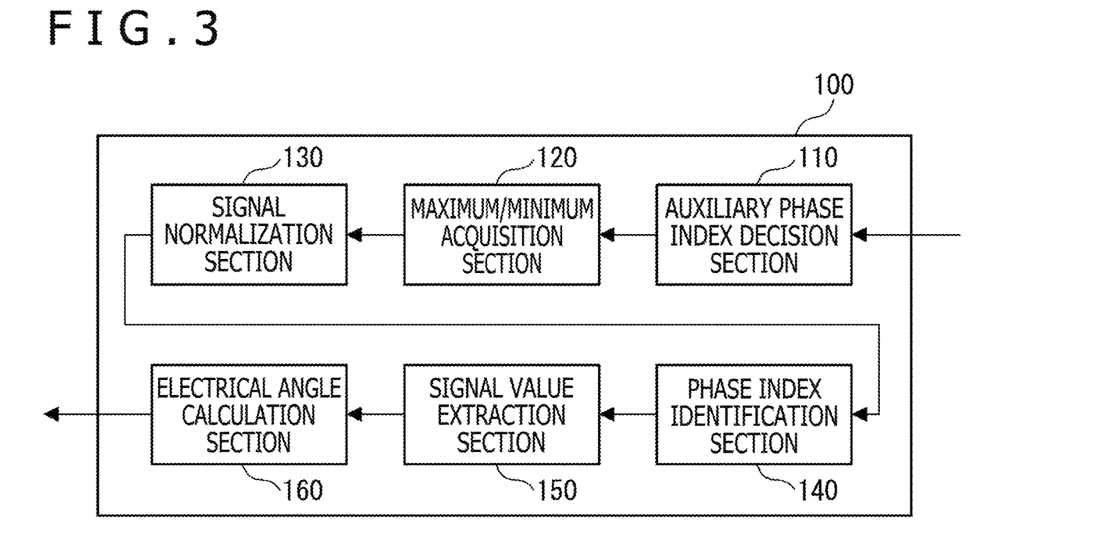
FIG. 3 is a diagram illustrating a functional configuration of an electrical angle calculation device illustrated in FIG. 1.

FIG. 3 is a diagram illustrating a functional configuration of an electrical angle calculation device 100 illustrated in FIG. 1. The electrical angle calculation device 100 is implemented with, for example, a computer having a communication interface, a processor, and a memory. The processor operates according to a program that is stored in the memory or is received through the communication interface to implement functions of an auxiliary phase index decision section 110, a maximum/minimum acquisition section 120, a signal normalization section 130, a phase index identification section 140, and a signal value extraction section 150 by software. The function of each section will be described below.

Figure 4:
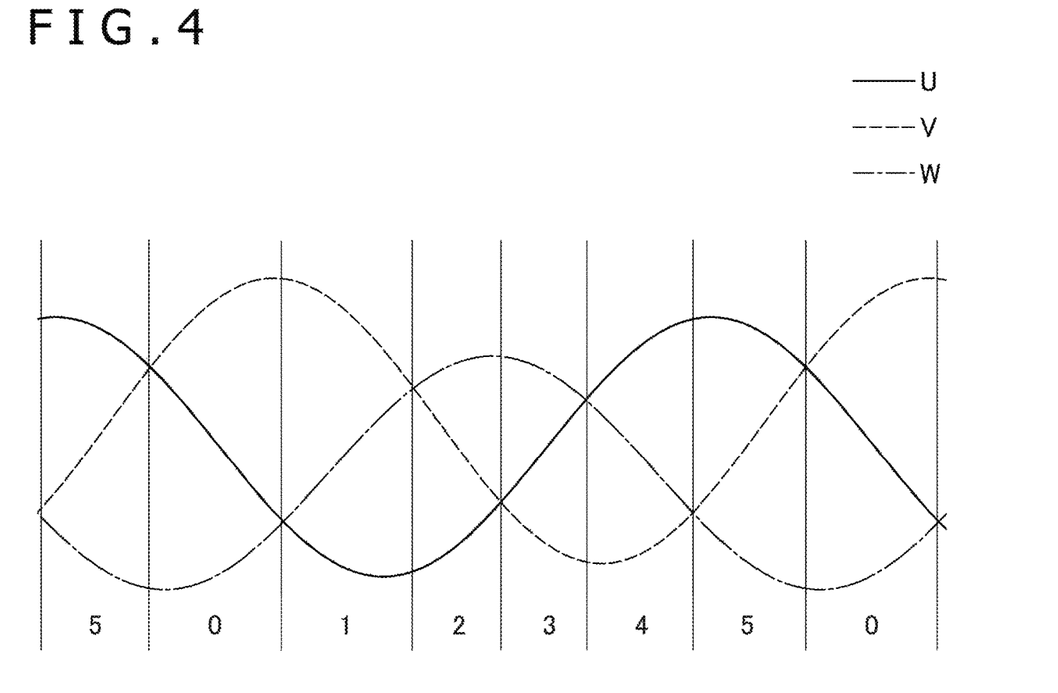
FIG. 4 is a view explaining decision of an auxiliary phase index in the exemplary embodiment of the present disclosure.

The auxiliary phase index decision section 110 decides auxiliary phase indices indicating an amplitude relation between the signal values U, V, and W (raw data before normalization) of the analogue Hall sensors 21 for each phase section. In an example illustrated in FIG. 4, with respect to the signal values U, V, and W acquired over a certain period, Index 0 to Index 5 are defined as below. Note that, at this point, the signal values U, V, and W are different in amplitude and offset from each other. Therefore, lengths of phase sections corresponding to decided indices are not equal.

Figure 5:
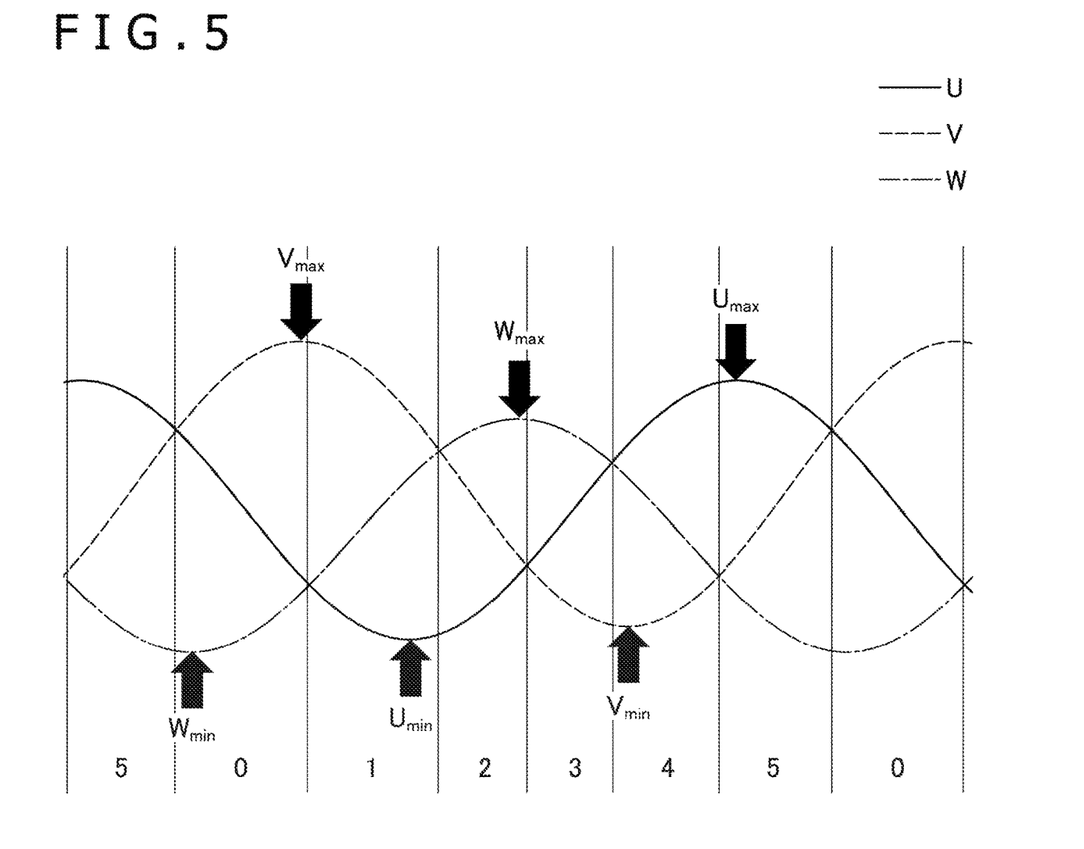
FIG. 5 is a view explaining acquisition of a maximum and a minimum of each signal value in the exemplary embodiment of the present disclosure.

Index 0: V≥U, U>W
Index 1: V>W, W≥U
Index 2: W≥V, V>U
Index 3: W>U, U≥V
Index 4: U≥W, W>V
Index 5: U>V, V≥W The maximum/minimum acquisition section 120 acquires a maximum and a minimum of each signal value used for normalizing the signal values of the analogue Hall sensors 21. Specifically, the maximum/minimum acquisition section 120 searches for a maximum of a signal value that is indicated as a maximum among the signal values U, V, and W by the auxiliary phase indices decided by the auxiliary phase index decision section 110. In addition, the maximum/minimum acquisition section 120 searches for a minimum of a signal value that is indicated as a minimum among the signal values U, V, and W by the auxiliary phase indices decided by the auxiliary phase index decision section 110. In an example in FIG. 5, the maximum/minimum acquisition section 120 searches for a minimum $W_{min}$ of the signal value W in Index 5 and Index 0, searches for a maximum $V_{max}$ of the signal value V in Index 0 and Index 1, and searches for a minimum $U_{min}$ of the signal value U in Index 1 and Index 2. Hereafter, the maximum/minimum acquisition section 120 similarly searches for a maximum $W_{max}$ of the signal value W, a minimum $V_{min}$ of the signal value V, and a maximum $U_{max}$ of the signal value U.

Figure 6:
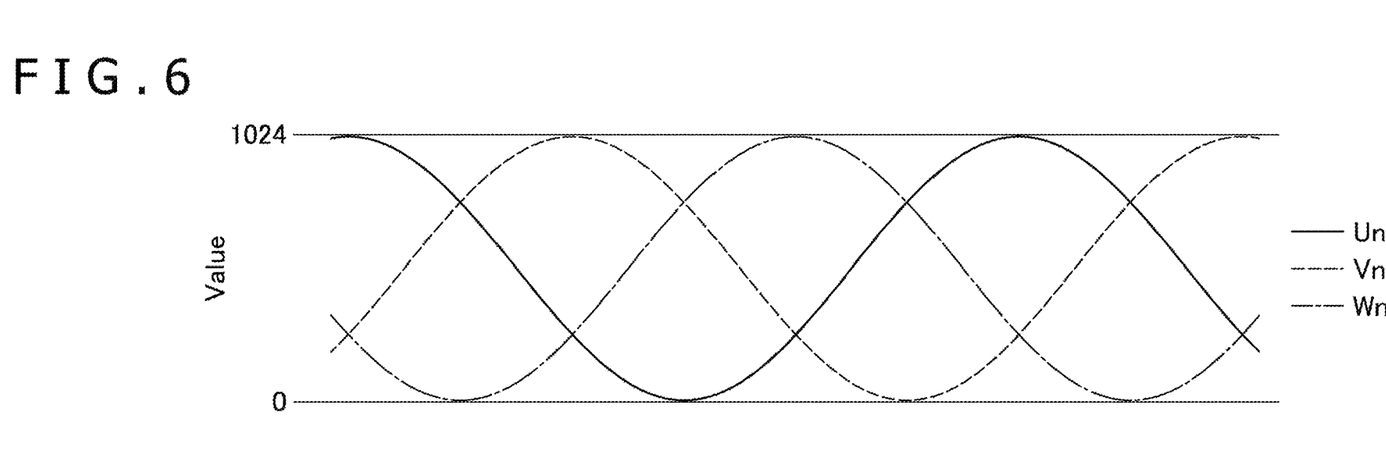
FIG. 6 is a view explaining normalization of the signal values in the exemplary embodiment of the present disclosure.

The signal normalization section 130 normalizes the signal values of the analogue Hall sensors 21 based on the maximums and the minimums acquired by the maximum/minimum acquisition section 120. Specifically, the signal normalization section 130 uses amplitude (peak to peak) $U_{pp}$, $V_{pp}$, and $W_{pp}$ that are respective differences between the maximums $U_{max}$, $V_{max}$, and $W_{max}$ and the minimums $U_{min}$, $V_{min}$, and $W_{min}$, which are acquired by the maximum/minimum acquisition section 120, and offset amounts $U_{offset}$, $V_{offset}$, and $W_{offset}$ that are respectively equal to the minimums $U_{min}$, $V_{min}$, and $W_{min}$ to normalize the signal values U, V, and W. Normalized signal values $U_n$, $V_n$, and $W_n$ as illustrated in FIG. 6 are then acquired. Note that P2P_NORM is the number of samples corresponding to the amplitude (peak to peak), and P2P_NORM=1024 is used below as an example.

$$U_{pp}=U_{max}-U_{min}, V_{pp}=V_{max}-V_{min}, W_{pp}=W_{max}-W_{min}$$

$$U_{offset}=U_{min}, V_{offset}=V_{min}, W_{offset}=W_{min}$$

$$U_n=(U-U_{offset})*P2P\_NORM/U_{pp},$$

$$V_n=(V-V_{offset})*P2P\_NORM/V_{pp},$$

$$W_n=(W-W_{offset})*P2P\_NORM/W_{pp}$$

Figure 7:
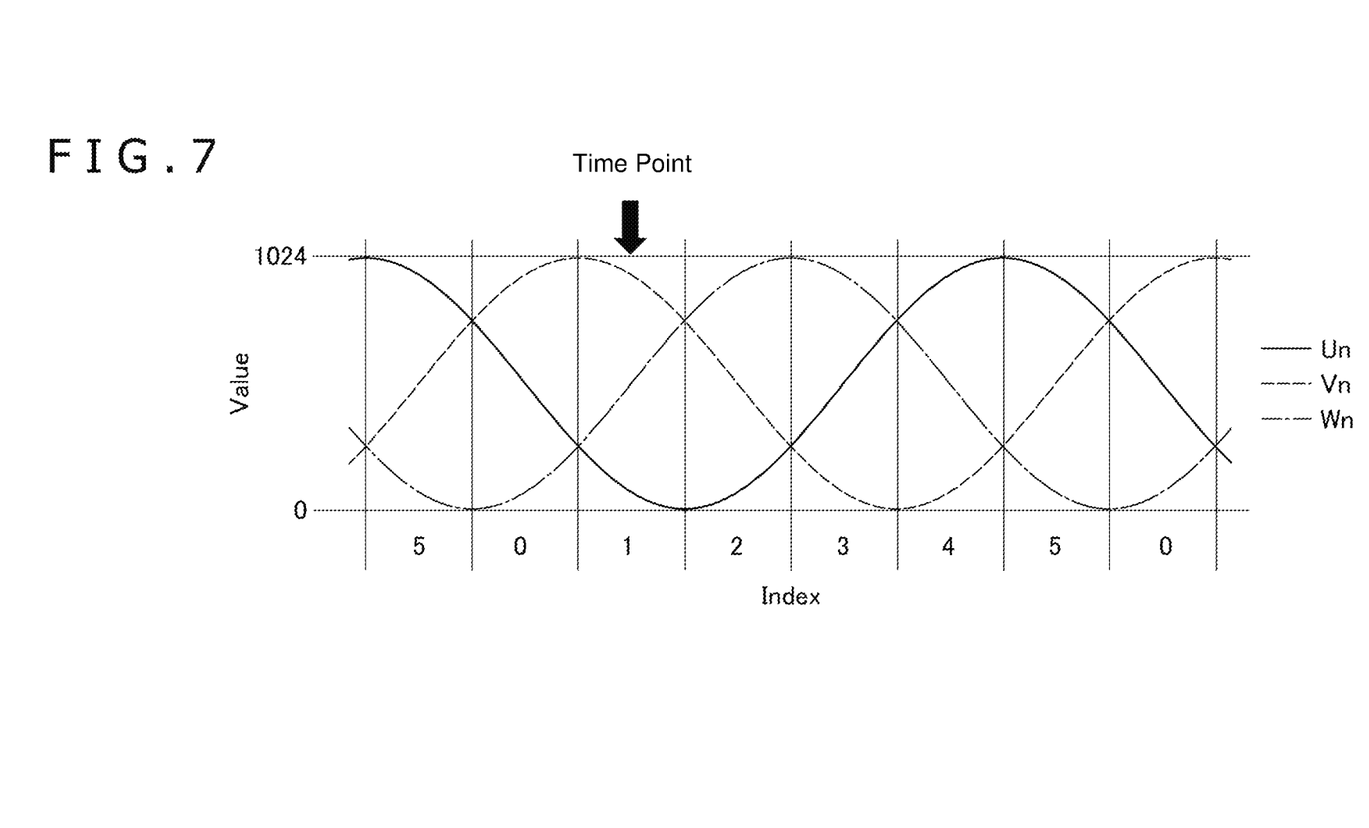
FIG. 7 is a view explaining identification of a phase index in the exemplary embodiment of the present disclosure.

The phase index identification section 140 identifies phase indices indicating an amplitude relation between the signal values $U_n$, $V_n$, and $W_n$ normalized by the signal normalization section 130 for each phase section. The auxiliary phase index decision section 110 decides phase indices for the signal values acquired over a certain period for the normalization. In contrast, the phase index identification section 140 identifies phase indices at the present time whose electrical angle is to be calculated. In an example in FIG. 7, Index 0 to Index 5 are defined as below. At a time point indicated by an arrow in FIG. 7, $V_n>W_n$ and $W_n \geq U_n$ are satisfied, and therefore Index 1 is identified. By identifying the phase index, a signal to be extracted by the subsequent signal value extraction section 150 can be easily decided.

Figure 8A:
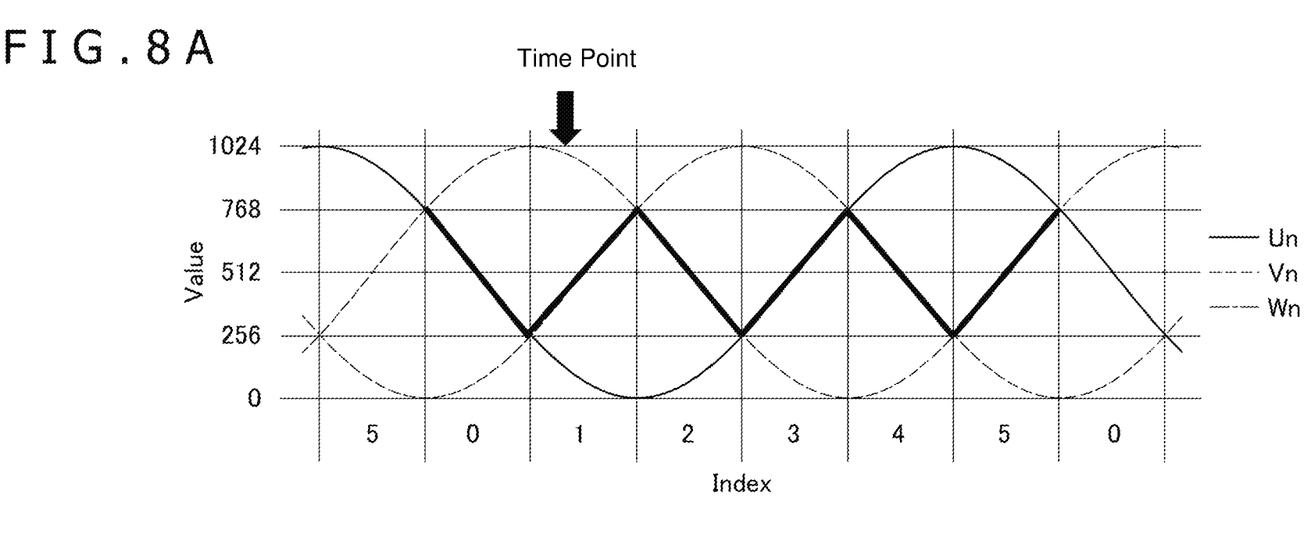
FIGS. 8A and 8B are views explaining extraction of the signal values and calculation of the electrical angle in the exemplary embodiment of the present disclosure.

Index 0: $V_n \geq U_n$, $U_n > W_n$
Index 1: $V_n > W_n$, $W_n \geq U_n$
Index 2: $W_n \geq V_n$, $V_n > U_n$
Index 3: $W_n > U_n$, $U_n \geq V_n$
Index 4: $U_n \geq W_n$, $W_n > V_n$
Index 5: $U_n > V_n$, $V_n \geq W_n$ The signal value extraction section 150 extracts signal values that monotonously increase or decrease with respect to the electrical angle from signal values $U_n$, $V_n$, and $W_n$. Specifically, in an example illustrated in FIG. 8A, the signal value extraction section 150 refers to the phase indices decided by the phase index identification section 140, and extracts a signal value that is not either the maximum or the minimum among the signal values $U_n$, $V_n$, and $W_n$ for each phase section. In the illustrated example, the signal value $u_n$ is extracted in Index 0 and Index 3, the signal value $W_n$ is extracted in Index 1 and Index 4, and the signal value $V_n$ is extracted in Index 2 and Index 5. As described above, in those phase sections, the extracted signal values monotonously increase or decrease in a substantially linear manner with respect to the electrical angle.

Figure 8B:
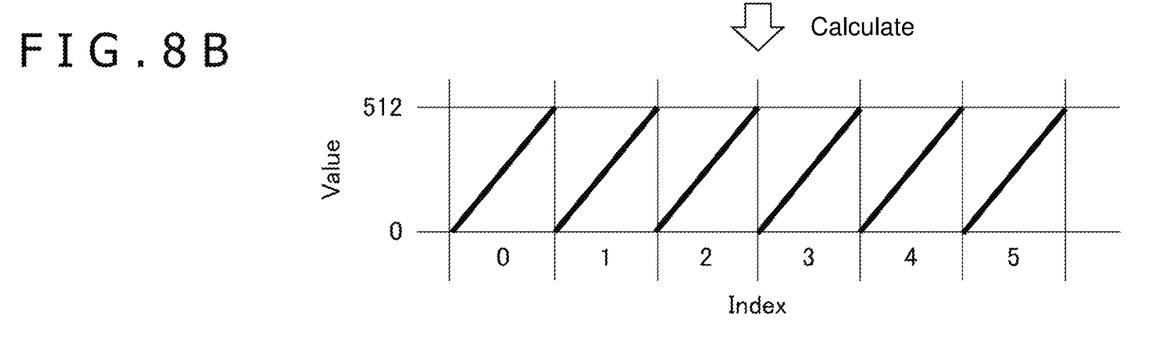

An electrical angle calculation section 160 calculates the electrical angle from the signal values $U_n$, $V_n$, and $W_n$ extracted by the signal value extraction section 150. Since the extracted signal values $U_n$, $V_n$, and $W_n$ repeat monotonous increase and monotonous decrease for each section corresponding ⅙ period, the signal values are shifted in a minus direction by 256 (¼ of amplitude), and signs are inverted in phase sections of even indices (Index 0, Index 2, and Index 4), in an example illustrated in FIG. 8B. With this procedure, the signal values are converted into a signal value S that monotonously increases from 0 to 512 (½ of amplitude) for each ⅙ period (period of one index). In this case, an electrical angle θ can be calculated by θ=n*512+S using the signal value S and an index number n. Note that, since the signal values of the phase sections extracted by the signal value extraction section 150 monotonously increase or decrease with respect to the electrical angle, the method for calculating the electrical angle is not limited to the above-described method, and various methods can be used.

Figure 9:
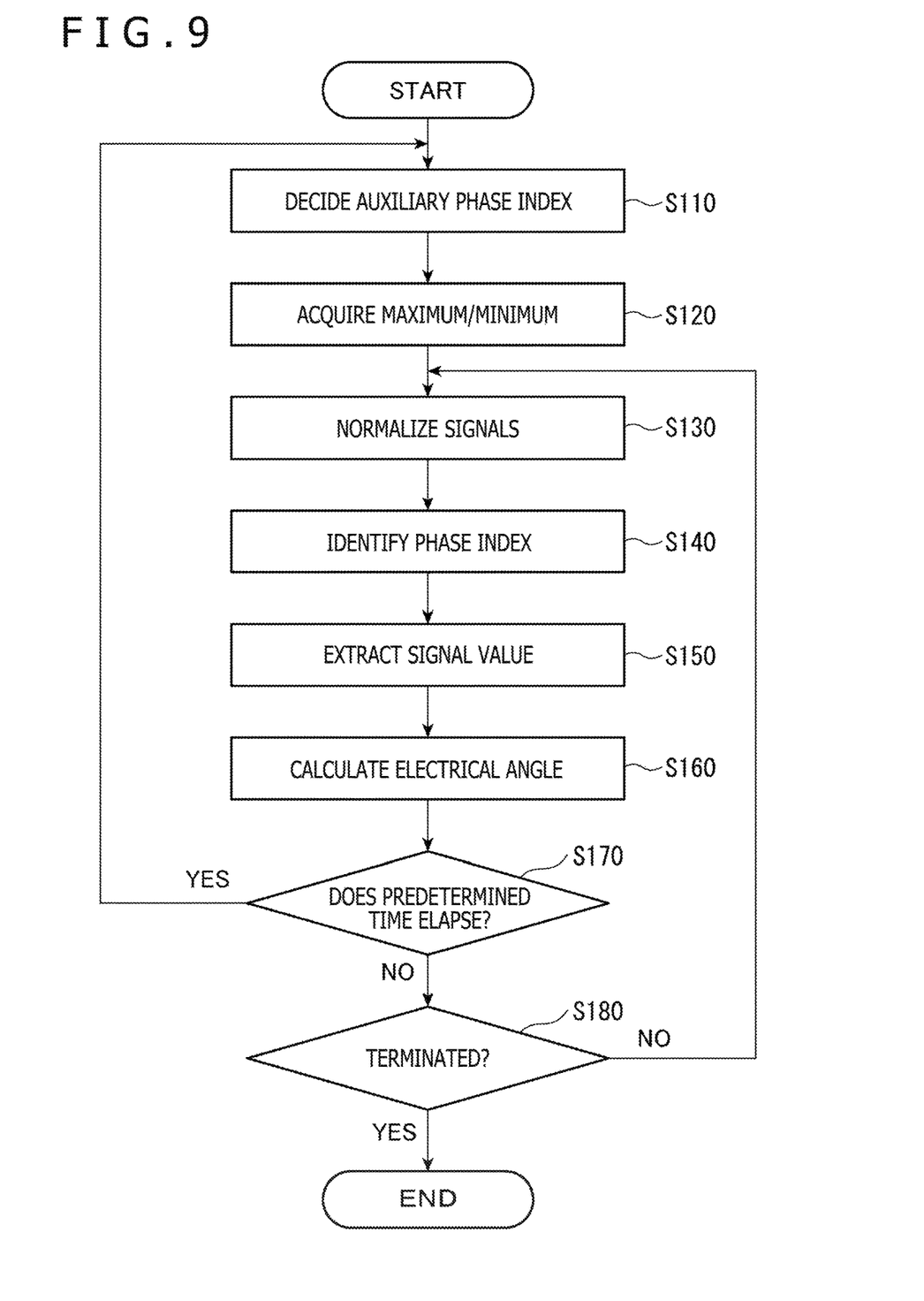
FIG. 9 is a flowchart illustrating an example of a calculation process of the electrical angle according to the exemplary embodiment of the present disclosure.

FIG. 9 is a flowchart illustrating an example of a calculation process of the electrical angle according to the exemplary embodiment of the present disclosure. In the illustrated example, the calculation process of the electrical angle includes an auxiliary phase index decision step (S110), a maximum/minimum acquisition step (S120), a signal normalization step (S130), a phase index identification step (S140), a signal value extraction step (S150), and an electrical angle calculation step (S160) respectively corresponding to processes of the auxiliary phase index decision section 110, the maximum/minimum acquisition section 120, the signal normalization section 130, the phase index identification section 140, the signal value extraction section 150, and the electrical angle calculation section 160, which are described above.

Herein, depending on, for example, a change in temperature, amplitude and offset of the output signal value of each analogue Hall sensor 21 vary even during an operation of the BLDC 20. From this reason, in a case where a predetermined time elapses, the auxiliary phase index decision step (S110) and the maximum/minimum acquisition step (S120) may be repeated (S170).

Before the predetermined time elapses, the signal normalization step (S130), the phase index identification step (S140), the signal value extraction step (S150), and the electrical angle calculation step (S160) are repeated (S180). With this procedure, the electrical angle can continuously be calculated while maintaining the amplitude and the offset used for normalizing each signal value to be appropriate values.

Figure 10:
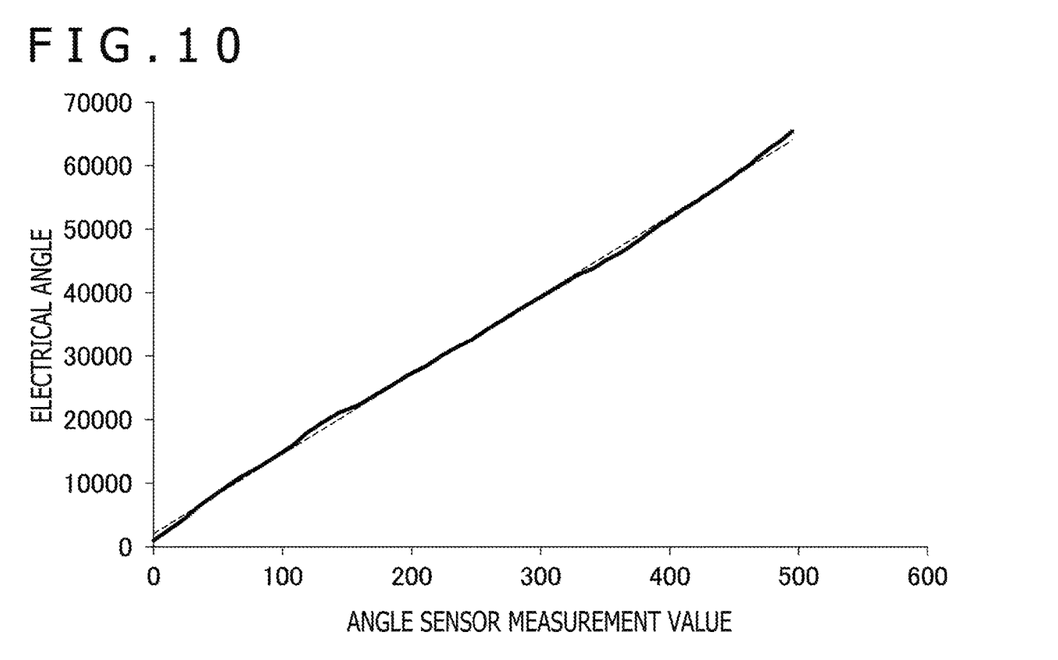
FIG. 10 is a graph illustrating a verified result of calculation accuracy of the electrical angle in the exemplary embodiment of the present disclosure.

FIG. 10 is a graph illustrating a verified result of calculation accuracy of the electrical angle in the exemplary embodiment of the present disclosure. A tunnel magneto resistance (TMR) angle sensor is attached to a driving shaft of the BLDC 20. The graph in FIG. 10 illustrates a comparison result between the electrical angle θ calculated by the electrical angle calculation device 100 while rotary driving the BLDC 20, and a measurement value of the angle sensor. The signal value output by each analogue Hall sensor 21 has the sinusoidal shape, but it is not necessarily a perfect sinusoidal shape. Therefore the calculated value of the electrical angle θ includes an error of approximately 5° at maximum. However, linear correlation can be observed between the both. As illustrated in this result, in the present exemplary embodiment, the electrical angle can be calculated with practical accuracy.

In the exemplary embodiment of the present disclosure described above, the normalization is performed with respect to the outputs of the analogue Hall sensors embedded in the motor with an appropriate procedure as necessary, and the portions whose signal values and phases linearly vary are extracted. This allows the electrical angle to be calculated with practical accuracy without using, for example, an external rotary encoder. This is advantageous in terms of a reduction in size and cost of the device.

Note that, in the example of the above-described exemplary embodiment, the electrical angle is calculated using the three-phase signal values output from three analogue Hall sensors embedded in the stator of the BLDC 20. However, in another example, the electrical angle may be calculated using signal values output from four or more, for example, six analogue Hall sensors. In a case where outputs of more analogue Hall sensors are used, by extracting portions in which a relation between the signal values and the phases is closer to a straight line, for example, calculation accuracy of the electrical angle can be improved.

In addition, in the example of the above-described exemplary embodiment, the auxiliary phase index decision section 110, the maximum/minimum acquisition section 120, and the signal normalization section 130 normalize the signal values U, V, and W of the analogue Hall sensors 21. However, in a case where, for example, another unit provides normalized signal values, the electrical angle calculation device does not necessarily include those components. In addition, the phase index identification section 140 is provided to facilitate decision of the signal extracted by the signal value extraction section 150. However, in a case where, for example, the signal value extraction section 150 directly determines the amplitude relation between the signal values and extracts the signal value, the phase index identification section 140 is not necessarily provided.

As described above, with reference to the accompanying drawings, some exemplary embodiments of the present disclosure have been described in detail, but the present disclosure is not limited to those examples. It is obvious that persons having common knowledge in a technical field to which the present disclosure belongs can conceive of various changes and modifications in the range of the technical idea described in the claims, and those also belong to the technical range of the present disclosure.

What is claimed is:

1. An electrical angle calculation device comprising:
   a signal value extraction section that extracts a signal value that monotonously increases or monotonously decreases with respect to an electrical angle of a motor from output signal values of a plurality of Hall sensors embedded in a stator of the motor; and
   an electrical angle calculation section that calculates the electrical angle from the extracted signal value.

2. The electrical angle calculation device according to claim 1,
   wherein the signal value extraction section extracts a signal value that is not either a maximum or a minimum among three or more signal values included in the output signal values for each phase section.

3. The electrical angle calculation device according to claim 2, further comprising:

a phase index identification section that identifies a phase index indicating an amplitude relation between the three or more signal values for each phase section, wherein the signal value extraction section refers to the phase index and extracts the signal value.

4. The electrical angle calculation device according to claim 1, further comprising:

a signal normalization section that normalizes the output signal values.

5. The electrical angle calculation device according to claim 4, further comprising:

a maximum/minimum acquisition section that acquires a maximum and a minimum of each of the output signal values, wherein the signal normalization section normalizes the output signal values using amplitude that is a difference between the maximum and the minimum, and an offset amount that is equal to the minimum.

6. The electrical angle calculation device according to claim 5, further comprising:

an auxiliary phase index decision section that decides an auxiliary phase index indicating an amplitude relation between three or more signal values included in the output signal values before normalization for each phase section, wherein the maximum/minimum acquisition section searches for the maximum of the signal value that is indicated to be maximum among the three or more signal values by the auxiliary phase index, and the minimum of the signal value that is indicated to be minimum among the three or more signal values by the auxiliary phase index.

7. An electrical angle calculation method comprising:

extracting a signal value that monotonously increases or monotonously decreases with respect to an electrical angle of a motor from output signal values of a plurality of Hall sensors embedded in a stator of the motor; and calculating the electrical angle from the extracted signal value.

8. A program for a computer, comprising:

by a signal value extraction section, extracting a signal value that monotonously increases or monotonously decreases with respect to an electrical angle of a motor from output signal values of a plurality of Hall sensors embedded in a stator of the motor; and by an electrical angle calculation section, calculating the electrical angle from the extracted signal value.

* * * * *